United States Patent [19]
Becker

[11] Patent Number: 5,829,733
[45] Date of Patent: Nov. 3, 1998

[54] ADJUSTABLE HEIGHT SHOCK ABSORBING BICYCLE SEAT MOUNTING ASSEMBLY

[76] Inventor: William R. Becker, 67 Hickory Forest Dr., Hilton Head Island, S.C. 29926

[21] Appl. No.: 758,399

[22] Filed: Nov. 29, 1996

Related U.S. Application Data

[60] Provisional application No. 60/008,302, Dec. 6, 1995.

[51] Int. Cl.$^6$ ....................................... B62K 1/00
[52] U.S. Cl. ........................... 248/631; 248/404; 280/283; 297/199
[58] Field of Search ..................................... 248/562, 599, 248/602, 631, 404, 157; 280/283; 297/195.1, 199

[56] References Cited

U.S. PATENT DOCUMENTS

| | | | |
|---|---|---|---|
| 588,993 | 8/1897 | Hindmarsh | 248/631 X |
| 593,798 | 11/1897 | Byrne . | |
| 598,234 | 2/1898 | Thompson | 248/631 X |
| 640,483 | 1/1900 | McKenzie | 280/283 |
| 2,644,504 | 7/1953 | Vick . | |
| 3,522,957 | 8/1970 | Topor | 280/283 |
| 3,861,740 | 1/1975 | Tajima . | |
| 3,891,236 | 6/1975 | Kuwano | 280/283 |
| 4,108,416 | 8/1978 | Nagase et al. | 248/631 X |
| 5,044,592 | 9/1991 | Cienfuegos | 248/408 |
| 5,044,648 | 9/1991 | Knapp | 248/631 X |
| 5,094,424 | 3/1992 | Hartway | 280/283 X |
| 5,236,169 | 8/1993 | Johnsen | 248/161 |
| 5,324,058 | 6/1994 | Massaro | 280/283 |
| 5,382,039 | 1/1995 | Hawker | 280/283 |
| 5,383,705 | 1/1995 | Voigt | 297/195.1 X |
| 5,553,880 | 9/1996 | McJunkin et al. | 280/283 |

*Primary Examiner*—Ramon O. Ramirez
*Assistant Examiner*—Derek J. Berger
*Attorney, Agent, or Firm*—Willard M. Hanger

[57] ABSTRACT

A shock-absorbing and height-adjusting assembly for mounting a seat onto the seat-supporting framework tubing of a bicycle frame. A standard, commercially available, adjustable-length gas spring (hydropneumatic spring), of the type used for the control column of adjustable height chairs, is slideably contained within a hollow receiver attached alongside or within a lower portion of the bicycle seat supporting framework to which the gas spring piston rod is affixed with the upper end of the gas spring in underlying contact with the lower end of a vertically extending elongated cylindrical seat supporting guide tube supported in alignment with the gas spring for axial and non-rotational movement within a bushing assembly affixed to the uppermost portion of the bicycle seat supporting framework. A push rod slideably contained within a longitudinally extending bore within the guide tube for vertical movement between a raised position with the push rod lower end overlying a top mounted gas spring actuator and a lowered position in operational contact with the gas spring actuator. The push rod being operable through flexible shafting connected to a hand-operated control mounted on the bicycle handlebars in which movement of the hand control raises and lowers the push rod into and out of actuating contact with a gas spring actuator as establishes the gas spring into various length and locking modes commensurate with the weight loading applied on the bicycle seat.

19 Claims, 7 Drawing Sheets

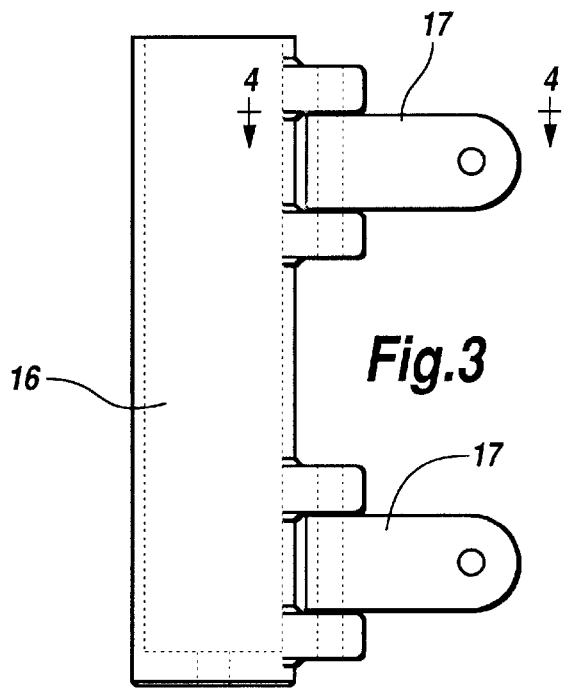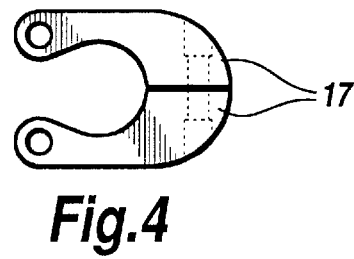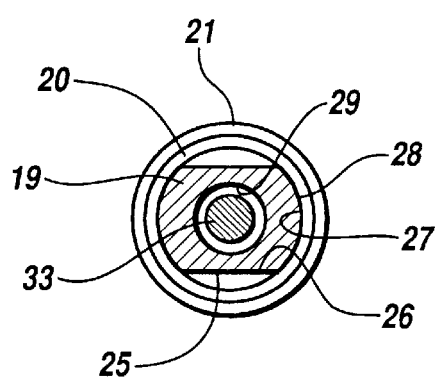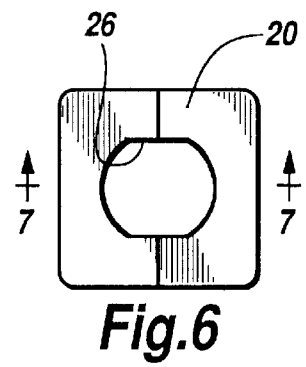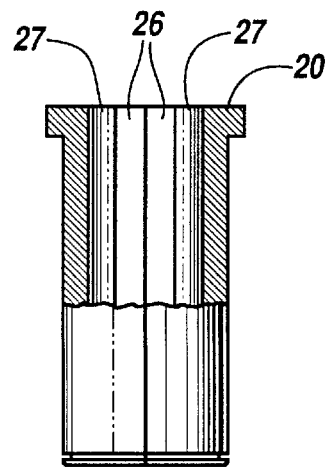

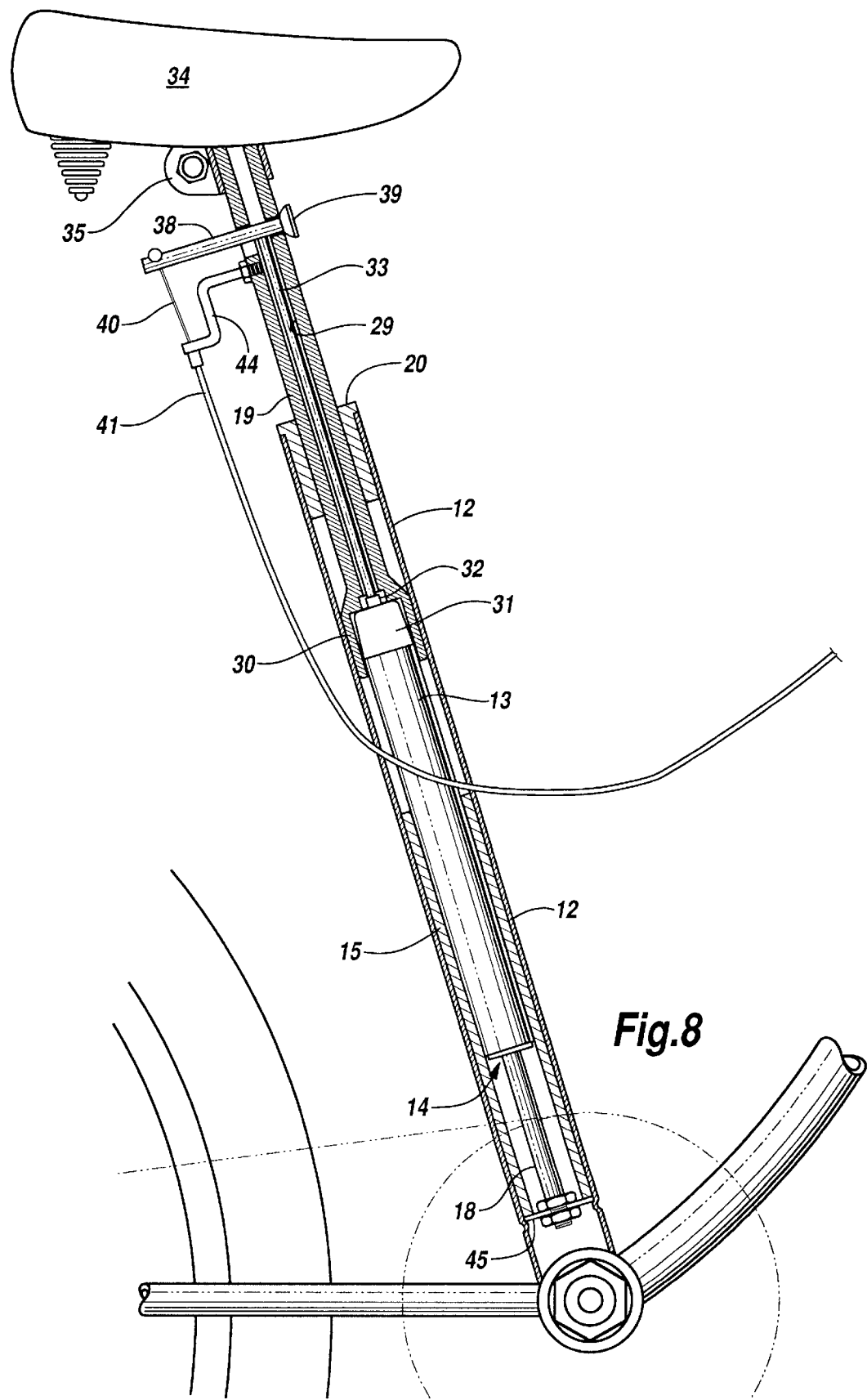

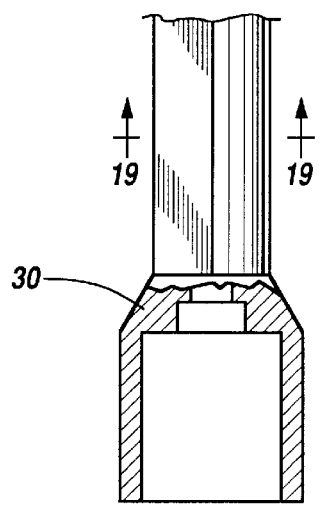
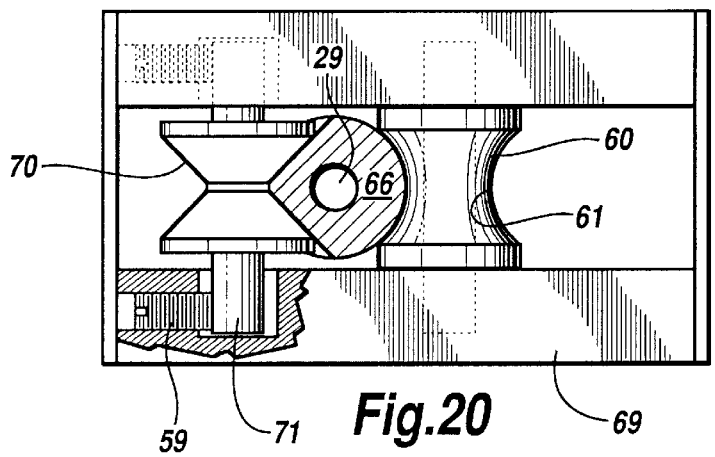
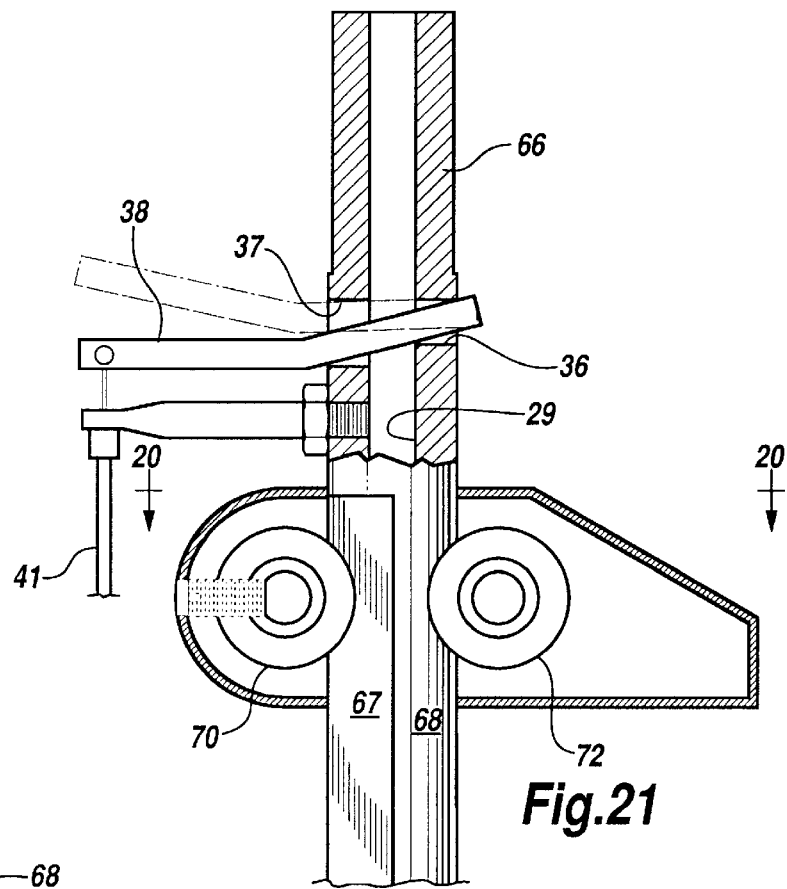
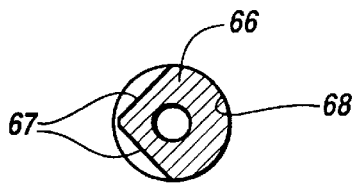

ADJUSTABLE HEIGHT SHOCK ABSORBING BICYCLE SEAT MOUNTING ASSEMBLY

BACKGROUND OF THE INVENTION

This application claims the benefit of U.S. Provisional Patent Application No. 60/008,302 filed Dec. 6, 1995.

The invention of the application relates to a shock-absorbing bicycle seat mounting assembly that permits adjustment of the height of the seat by the rider before or while mounted on the bicycle.

Production bicycles normally have the seat affixed to the top of a supporting shaft that is insertable into a vertically extending tube of the bicycle framework, the supporting shaft being held in place by one or more set screws in the bicycle frame that engage the supporting shaft. Thus, adjustment of the seat height cannot be done with the rider mounted on the bicycle so that adjustment of a comfortable seat height has to be done by trial and error, with the rider mounting on and off the seat several times. Furthermore, the seat supporting shaft and bicycle framework of production bicycles are rigidly interconnected so that shocks transmitted to the bicycle frame when the wheels encounter rough terrain are transmitted directly to the seat and the rider.

Various types of replacements for seat mounting assemblies of production bicycles have been proposed to allow easier adjustment of bicycle seat height with the rider either mounted or dismounted, some of which include shock-absorbing features. Designs have been proposed of seat mounting assemblies attached as a separate unit to the bicycle frame as in U.S. Pat. Nos. 593,798 and 3,522,951. Other designs have been proposed in which the seat mounting assembly parts are mounted within the interior of the bicycle framework tube from which the standard seat mounting shaft is removed of the nature of U.S. Pat. Nos. 2,644,504; 5,044,592; and 5,236,169 which utilize compression springs and mechanical locking stops or tailor-made metering oil cylinders as disclosed in U.S. Pat. Nos. 3,861,740 and 3,891,236. The components for these prior art mounting assemblies installed within the bicycle framework are, by and large, non-standard parts and assemblies requiring expensive and special fabrication.

SUMMARY OF THE INVENTION

The primary object of the present invention is to provide an assembly for mounting a seat on the frame of a bicycle which absorbs riding shock loads transmitted by the frame and allows height adjustment of the seat by the rider before or while mounted on the bicycle as a replacement for the standard seat mounting assemblies provided on production bicycles.

Another significant object of the present invention is to provide a replacement shock-absorbing and height-adjustable bicycle seat mounting assembly of which the major components comprise readily commercially available, off-the-shelf parts.

A further object of the present invention is to provide a shock-absorbing and height-adjusting bicycle seat mounting assembly retrofit kit for replacing the standard production bicycle seat mounting unit, which kit can be installed on an unmodified bicycle frame with simple, standard, readily available tools.

Basically, the invention comprises a commercially available adjustable-length gas spring (hydropneumatic spring), of the nature commonly used as an adjustable-length central supporting column for chairs, slideably contained within a hollow receiver attached alongside or contained within the lower portion of the bicycle seat supporting tubular framework to which the gas spring piston rod is connected with the upper end of the gas spring in underlying contact with the lower portion of a vertically extending, elongated seat support guide tube supported in alignment with a gas spring for sliding axial and non-rotational movement within a bushing assembly mounted alongside or within the uppermost portion of the bicycle frame seat supporting tube. The seat support guide tube has a longitudinally extending central bore in which a push rod is slideably contained for vertical movement with the lower end of the push rod overlying the gas spring operational actuator. A pivotable actuating lever extending transversely of the seat support guide tube overlies the top of the push rod and is connected through a flexible shaft to a hand-operable control mounted on the bicycle handlebars. Actuating the hand control pivots the actuating lever displacing the push rod downwardly into operational contact with the gas spring actuator, whereby the gas spring assumes and is locked into a length mode commensurate with the amount of weight applied to the top of the gas spring by the seat and supporting guide tube. As is well known, the pneumatic feature of a gas spring also provides spring action as establishes a dampening force when variations in loads are applied to the end of the gas spring.

BRIEF DESCRIPTION OF THE DRAWINGS

FIG. 3 is a side elevation of the gas spring receiver and attaching clamps of the mounting assembly of FIG. 2.

FIG. 4 is a top plan view of a receiver clamp along section line 4—4 of FIG. 3.

FIG. 5 is a cross-section along section line 5—5 of FIG. 2.

FIG. 6 is a top plan view of the seat support guide tube bushing shown in FIG. 2.

FIG. 7 is a side elevation, partially in section, of the bushing of FIG. 6.

FIG. 8 is a side elevation, partially in section, of a variation of the basic seat mounting assembly of FIG. 2 mounted within the seat supporting framework of the bicycle frame.

FIG. 18 is a side elevation, partially in section, of another embodiment of the guide tube of FIG. 13.

FIG. 19 is a cross-section along section line 19—19 of FIG. 18.

FIG. 20 is a plan view, partially in section, along section line 20—20 of FIG. 21.

FIG. 21 is a side elevation, partially in section, of another embodiment of FIG. 11 containing the guide tube of FIG. 18.

DETAILED DESCRIPTION OF THE INVENTION

Figure 1:
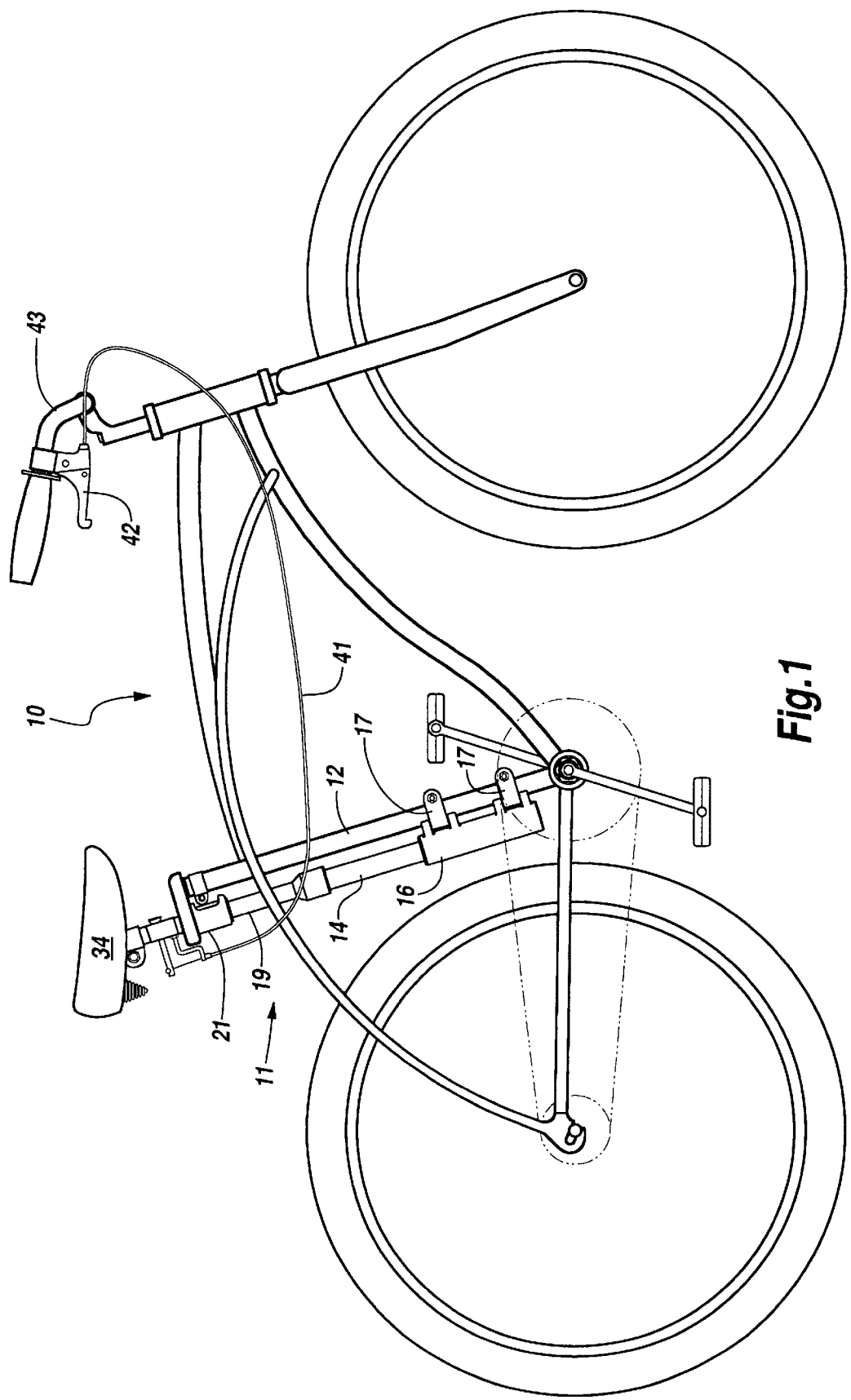
FIG. 1 is a side elevation of a first embodiment of a retrofit-type shock-absorbing, height-adjusting seat mounting assembly of the invention installed on a bicycle.
Figure 2:
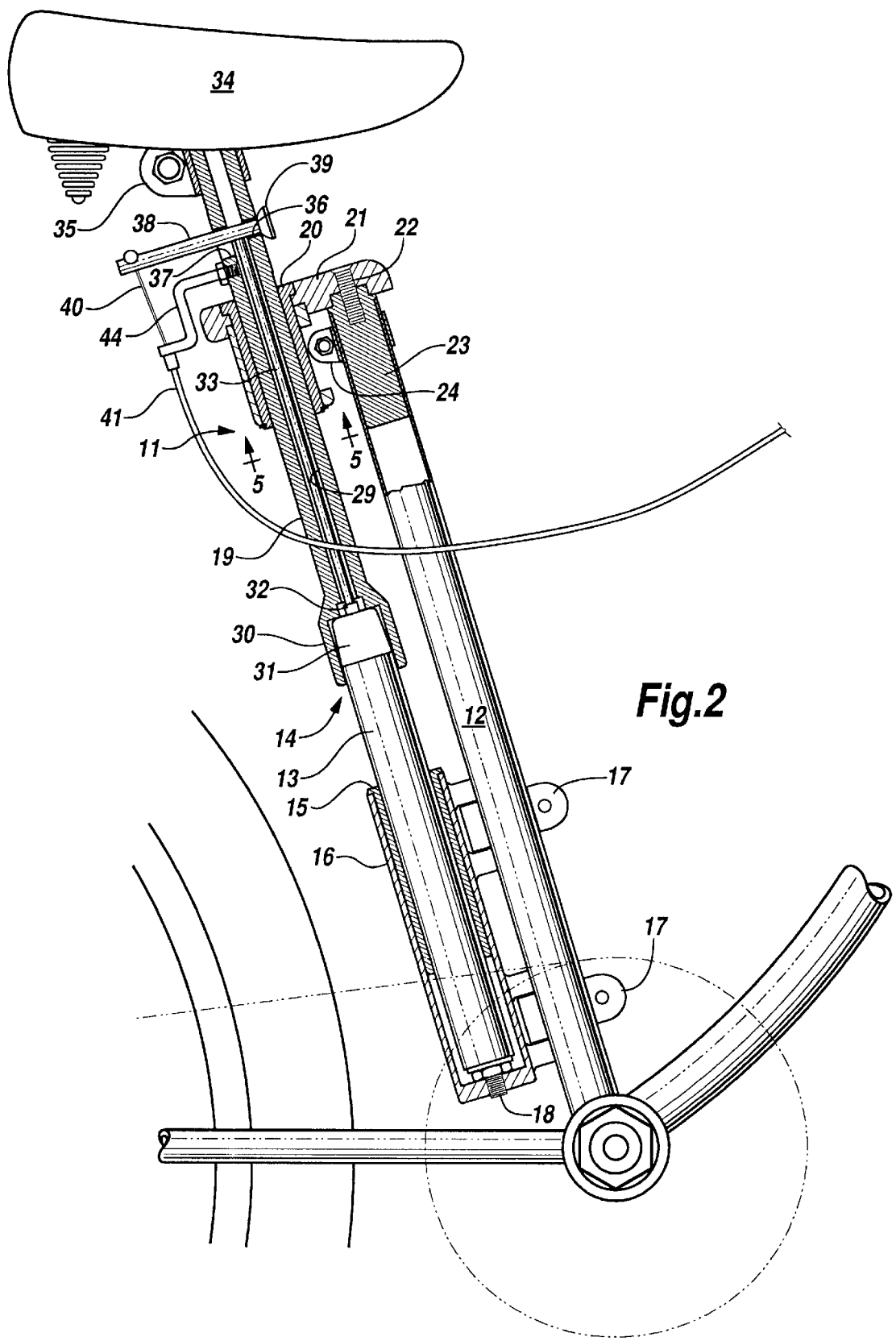
FIG. 2 is a side elevation partly in section of the seat mounting assembly of FIG. 1.

Referring to FIG. 1, illustrating a bicycle 10 outfitted with the seat mounting assembly 11, and more particularly with respect to FIG. 2 in which the mounting assembly 11 is mounted alongside and supported from the vertically oriented bicycle seat supporting framework 12. The outer housing 13 of a conventional gas spring 14 is slideably supported for vertical movement within a bushing 15 contained within a hollow receiver 16 clampingly attached to the lower end of the bicycle framework 12 by a pair of split clamps 17 with the lower end of the gas spring piston rod 18 affixed to the bottom of the receiver 16. The gas spring 14 is a conventional hydropneumatic type, length-adjusting gas spring of the type widely used as a support column for chairs of the type illustrated in U.S. Pat. No. 4,969,610, the gas spring utilized in the embodiment of FIG. 2 being Model 017-00TBD produced by Suspa Inc., although any gas spring of suitable dimensions with length-adjusting characteristics suitable for bicycle seat adjustment heights and having suitable energy-absorbing characteristics would be satisfactory.

A central portion of an elongated cylindrical guide tube 19, to the top of which the seat is attached, is supported for axial sliding and non-rotatable movement within a split bushing 20 contained within one end of a bushing support 21 that extends over the uppermost end of the bicycle seat supporting framework 12 with the support 21 affixed by the bolt 22 to the plug 23 inserted into and retained in the bicycle framework 12 by the retaining clamp 24. The structural provisions for restraining rotation of the guide tube 19 within the bushing 20 are illustrated in FIG. 5 in which the cylindrical guide tube opposite flattened ends 25 register with similar central flattened sides 26 of the split bushing 20 and the curved bushing end sides 27 register with similarly curved guide tube sides 28. The guide tube 19 contains a longitudinally extending central bore 29 that extends into the guide tube enlarged, hooded lower portion 30 that fits over and contains the gas spring upper end portion 31 from which the gas spring actuator 32 extends. A push rod 33 is slideably contained for vertical movement within the guide tube bore 29 with the lower end of the push rod underlying the gas spring actuator 32. An upper portion of the guide tube 19, to the top end of which the bicycle seat 34 is affixed by the clamp 35, is transversely pierced by a hole of which the diameter 36 on the rear side of the guide tube is greater than the diameter on the front side of the guide tube. An actuating lever 38 having an enlarged retaining head 39 extends transversely of the guide tube through the holes 36–37 above the top end of the push rod 33, the diameter of the actuating lever 38 being such that the lever can be pivoted vertically about the retaining head 39. A pull wire 40 attached to the outer end of the actuating lever 38 and supported within a flexible tube 41 extends between the actuating lever 38 and a hand control 42 mounted on the bicycle handlebars 43 and is connected such that lifting the hand control pivots the actuating lever 38 downwardly against the push rod 33 which is moved downwardly into pressing actuating contact with the gas spring actuator 32. The flexible tube 41 is conveniently supported by an S-bar 44 bolted to the guide tube 19.

The bicycle seat 34 can be most conveniently placed in its lowered position with the rider mounted on the bicycle atop the seat by lifting upwardly on the handlebar-mounted hand control 42 causing the actuating lever 38 to pivot downwardly against the push rod 33 displacing it into pressing operational contact with the gas spring actuator 32. Operationally actuating the gas spring with the weight of the rider on the seat 34 transmitted through the guide tube 19 onto the top of the actuated gas spring 14 results in the gas spring retracting to a shorter length with the gas spring housing 13 and overlying guide tube 19 sliding downwardly within their respective bushings 15, 20 toward or onto the bottom of the receiver 16. The mounting assembly is shown in a fully lowered position in FIG. 2. The seat can be placed in an intermediate height position by releasing the hand control before the gas spring becomes fully retracted. The bicycle is most conveniently mounted with the seat in the indicated lowered position. With the rider mounted on the bicycle with the seat in the lowered position and removing his weight from the seat by placing his feet on the bicycle pedals or ground, upon lifting the hand control lever the gas spring is actuated and expands to move the guide rod and seat upwardly to the raised position. With the rider mounted on and supported by the seat in a raised position, intermittent operation of a hand control permits the gas spring and supported seat to be locked into any desired intermediate height. The pneumatic features of the gas spring absorb riding shock loads that are transmitted from the bicycle wheels onto the bicycle frame.

FIG. 8 illustrates a variation of the basic concept of utilizing a gas spring device as a bicycle seat height controlling mechanism illustrated in retrofit form in FIG. 2, the variation involving the gas spring 14 and overlying seat support guide tube 19 being installed within the bicycle seat support framework rather than being mounted exteriorly of and alongside the bicycle framework 12. For simplicity and ease of identification, corresponding components of the invention are identified by the same numerals in FIG. 8 as in FIG. 2. Referring now to FIG. 8, the housing 13 of the gas spring 14 is slideably supported for vertical movement within a bushing 15 which is inserted into and press fitted into the interior of the lower portion of the bicycle framework tube 12. Bicycle frame tubing varies in size and in some instances, it would be preferable for a bicycle to be custom-fitted with a seat support framework tube having an interior diameter size to retain a bushing containing the gas spring or in which the interior of the framework tubing is configured to slideably contain a gas spring. Referring again to FIG. 8, the end of the gas spring piston rod 18 is affixed to a bottom plate 45 crimped into the lower end of the guide tube 12. As in FIG. 2, the upper end of the cylindrical seat support guide tube 19 is slideably contained within a split bushing 20 inserted into the upper end of the guide tube 12, the cross-sectional configurations of a guide tube and bushing being those indicated in FIG. 5 to restrain rotation of the guide tube and bushing. As in FIG. 2, an actuating lever 38 overlies the upper end of the push rod 33 slideably contained within the guide tube bore 29 with the lower end of the push rod overlying the actuator 32 of the gas cylinder 14. The operation of the seat mounting assembly of FIG. 8 is the same as previously described for FIG. 2. Whereas FIG. 2 illustrates the seat in a fully lowered position, FIG. 8 illustrates the raised position which would be assumed by the seat when the rider's weight is removed from the seat and the hand control on the handlebars has been moved into a position as brings the push rod into actuating contact with the gas spring such that the gas spring expands to maximum length.

Figure 9:
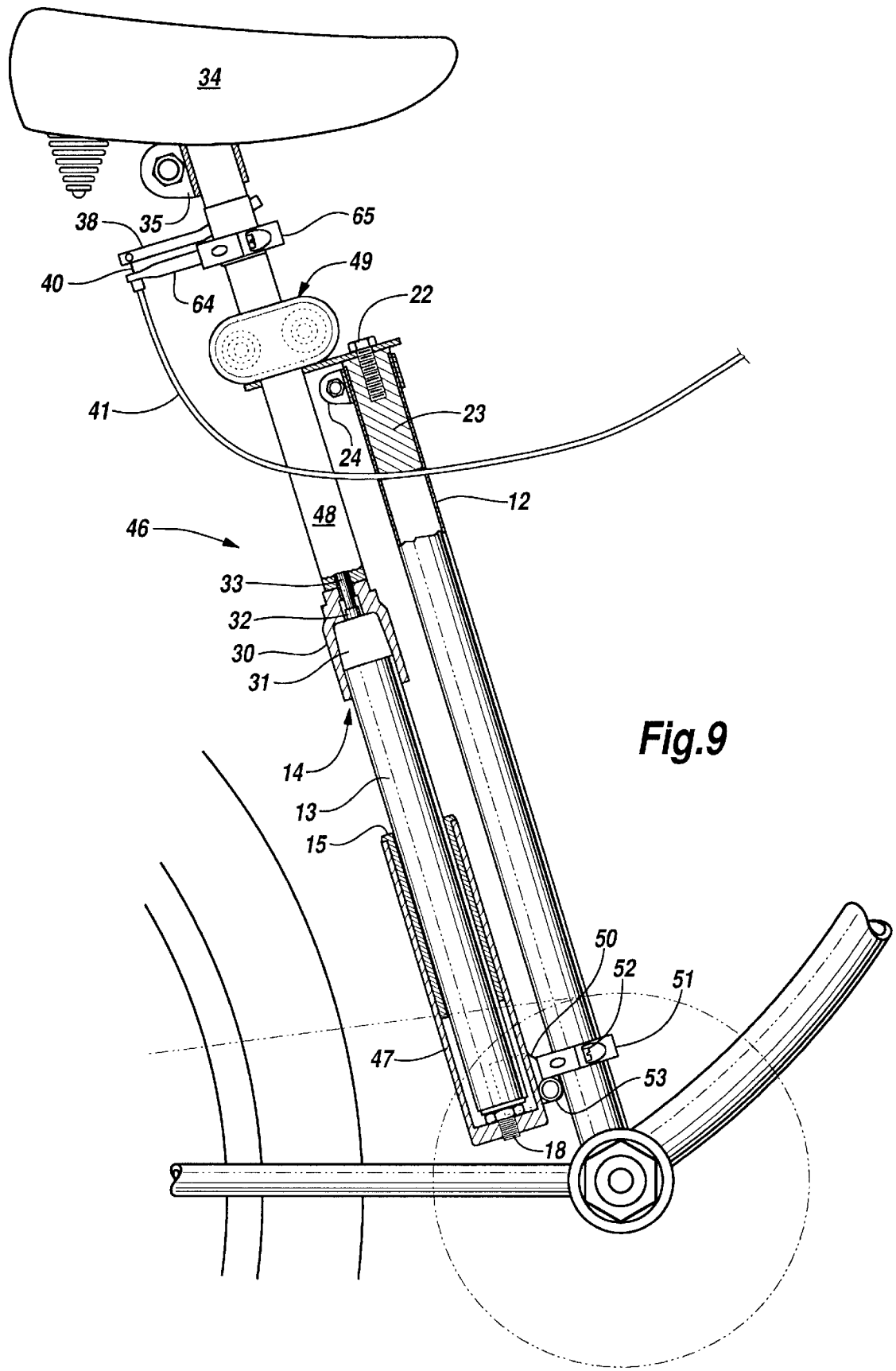
FIG. 9 is a side elevation, partially in section, of a second embodiment of a retrofit seat mounting assembly affixed onto a bicycle frame.
Figure 10:
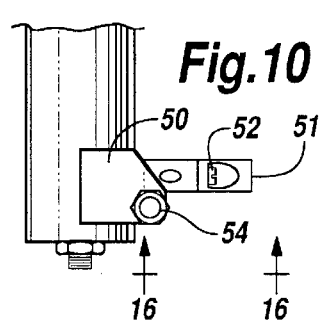
FIG. 10 is a side elevation of the lower portion of the seat mounting assembly of FIG. 9.

FIG. 9 illustrates a second embodiment of a retrofit bicycle seat mounting assembly of the nature of the previously described embodiment of FIG. 2 in which the primary differences are: (1) the manner of attaching the conventional gas spring 14 containing hollow receiver 46 to the bicycle seat supporting framework 12 and (2) the configuration of the bushing assembly 49 and seat supporting guide tube 48 supported for axial sliding and non-rotational movement within the bushing assembly to depend vertically therefrom in alignment atop the gas spring 14 slideably contained in bushing 15 contained within receiver 47, in the same manner previously described with respect to FIG. 2. To simplify the description, identical component parts in the embodiments of FIG. 2 and FIG. 9 are identified by the same numeral.

Figure 16:
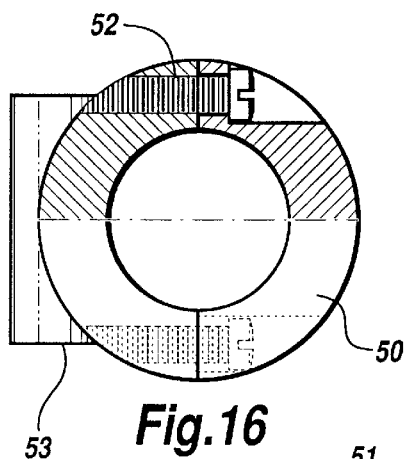
FIG. 16 is a plan view, partially in section, along section line 16—16 of FIG. 10.
Figure 12:
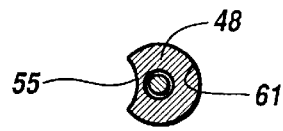
FIG. 12 is a cross-section along section line 12—12 of FIG. 11.
Figure 17:
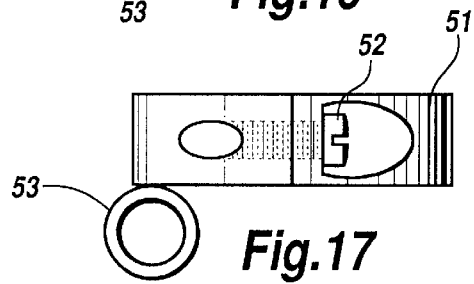
FIG. 17 is a side elevation of FIG. 16.

Referring now to FIGS. 9, 10, 16 and 17, the lower portion of the receiver 47 has a pair of vertically oriented ears 50 extending outwardly transversely of the receiver. As best seen in FIGS. 16 and 17, a split clamping ring 51 configured for clamping engagement around the circumference of bicycle framework 12 by clamping screws 52 has a receiver attaching sleeve 53 affixed along one side and transversely of the clamping ring. The sleeve 53 is dimensioned to fit between the pair of ears 50 and is affixed thereto by a bolt 54 extending through the sleeve 53. By attaching the lower portion of the receiver 47 to the bicycle framework 12 through the clamping ring 51 and horizontally extending sleeve 53 in the manner described, the vertical alignment of the gas spring containing receiver 47 and the guide tube 48 vertically depending from the bushing assembly 49 can be micro-adjusted, which is an important feature of the invention.

Figure 14:
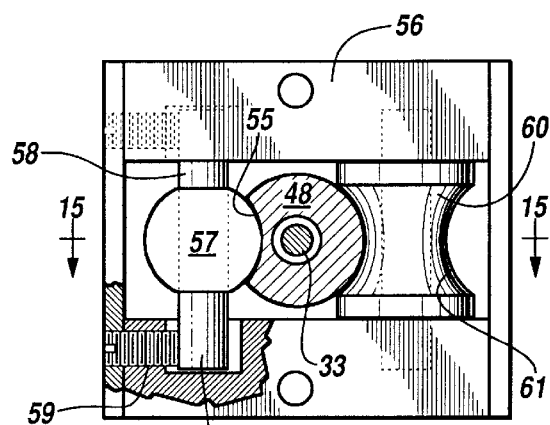
FIG. 14 is a plan view, partially in section, along section line 14—14 of FIG. 11.
Figures 11, 13:
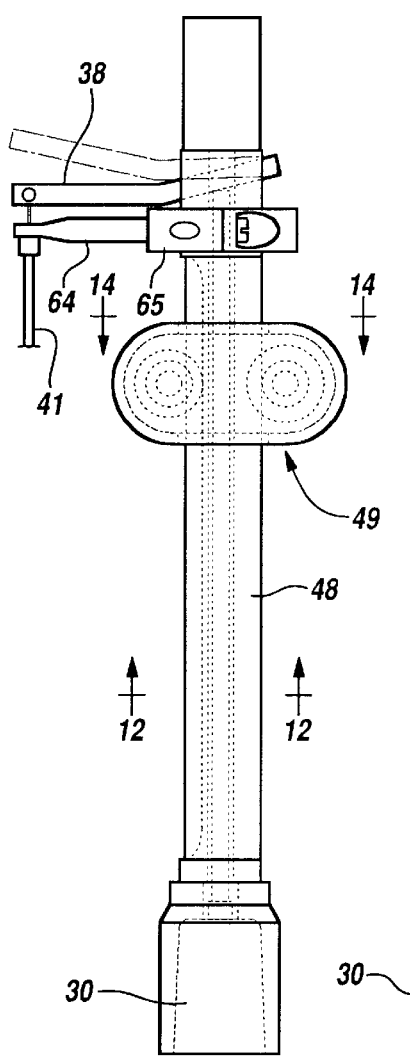
FIG. 11 is a side elevation of seat supporting components of the assembly of FIG. 9.
FIG. 13 is a front elevation of the guide tube component of the assembly of FIG. 11.
Figure 15:
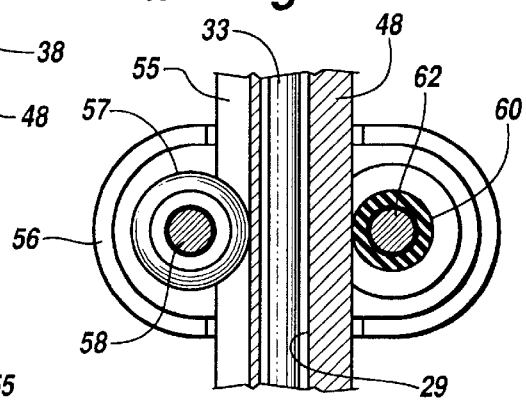
FIG. 15 is a cross-section along section line 15—15 of FIG. 14.

Referring now to FIGS. 11–15, the guide tube 48 has a concave groove 55 extending longitudinally along one side and is supported for axial sliding and non-rotational movement in the bushing assembly 49 in the manner best understood with reference to FIGS. 14 and 15. The bushing assembly housing 56 contains a ball 57, having a contour conforming to that of the guide tube groove 55, mounted on supporting shafts 58 for rotation in contact with the guide tube grooved area 55. Adjusting set screws 59 extending into the housing 56 into contact with the ball supporting shafts 58 allow adjustment of the ball 57 relative to the guide tube 48. A roller 60, having a central concave central portion 61 conforming to the curvilinear, ungrooved side of the guide tube 48, is mounted for rotation on shafting in contact with the guide tube side opposite the grooved portion. The bushing housing 56 is mounted onto one side of a support plate 63 of which the other side extends over the top of the bicycle seat supporting framework 12 and is attached thereto by the bolt attaching insert plug 23 and clamp 24 arrangement of FIG. 2. The bushing assembly contained in the housing 56 retains the guide tube 48, to which the seat 34 is attached, in vertical depending alignment with the gas spring 14 of which the upper end 31 is contained within the lower hood portion 30 of the guide tube 48. As in the configuration of the guide tube illustrated in FIG. 2, the guide tube 48 of the embodiment of FIGS. 9 and 11–15 contains a longitudinally extending central bore 29 in which a push rod 33 is slideably contained for axial sliding motion with the lower end of the push rod in an overlying relation to the actuator 32 of the gas spring 14. As in the embodiment of FIG. 2, an actuating lever 38 extending through the guide tube 48 to overlie the push rod 33 is pivotally mounted to move downwardly onto the push rod 33 and displace the rod lower end into operational contact with gas spring actuator 32 when actuated by a handlebar-mounted hand control connected to the actuating lever by pull wire 40 and flexible shaft 41 supported by a support bar 64 conveniently mounted on the guide tube 48 by a clamping ring 65.

A further embodiment of the invention is illustrated in FIGS. 18–21 in which one side of the central portion of the cylindrical guide tube 66 is milled longitudinally to form converging flat side portions 67 establishing a "V" cross-section opposite the unmilled curvilinear opposite side 68 of the guide tube, as is best seen in FIG. 19. The guide tube 66 is supported for axial sliding and non-rotational movement within the bushing housing 69 containing a roller 70, the central portion of which has a concave "V" shape conforming to that of the milled side 67 of the guide tube, mounted on shafts 71 for rotation in contact with the milled side 67 of the guide tube. A roller 60, having a concave central area 61 similar to that described with respect to FIG. 14, is supported for rotation in contact with the unmilled other curvilinear side of the guide tube 66. The operation of the embodiment illustrated and described with respect to FIGS. 9–21 is identical to that described with respect to the basic embodiment illustrated and described with respect to FIGS. 1–8.

A further embodiment of the invention (not illustrated) is a variation of the embodiment of FIG. 8 in which the seat mounting assembly of FIG. 9 is integrally contained within the bicycle frame. In this embodiment a FIG. 14 or 20 bushing housing 56 or 69 mounted atop the bicycle framework 12 provides axial sliding and non-rotational support of a FIG. 11 or FIG. 18 guide tube 48 or 66 vertically depending therefrom within the bicycle frame overlying gas spring 14 slideably contained in bushing 15 contained within the bicycle framework in the manner of FIG. 8. The operation of this embodiment is identical to that of FIG. 8.

Obviously, many modifications and variations of the foregoing disclosure are possible in light of these teachings, and numerous modifications of the described embodiments of the invention may be made without departing from the spirit and scope of the invention as set forth in the appendant claims.

What is claimed is:

1. A shock absorbing and adjustable height bicycle seat mounting assembly for installation onto a bicycle frame vertical seat support member for supporting a bicycle seat thereon, said mounting assembly comprising:

a seat supporting guide tube movably supported within bushing means with said guide tube and said bushing means mutually configured for axial sliding but non-rotational movement of said guide tube within said bushing means, said guide tube containing a longitudinally extending internal bore and having a top end adapted for mounting a bicycle seat thereon, means for supporting said bushing means from and laterally offset from an upper portion of the bicycle frame vertical seat support member with said guide tube contained in said bushing means vertically depending therefrom in juxtaposition of the bicycle frame vertical seat support member, a gas spring having an actuator and a piston rod along which said gas spring is operable for length adjusting axial movement in length adjusting and length locking modes upon operation of said actuator, a hollow receiver containing said gas spring for sliding axial movement therewithin with a lower end of said gas spring piston rod affixed to said receiver, means for attaching said hollow receiver onto a lower portion of the bicycle frame vertical seat support member in juxtaposition therefrom with said contained gas spring axially aligned with and having an upper portion engaging a lower end of said vertically depending guide tube, a push rod slidably contained within said guide tube bore for axial sliding movement therewithin between an upper position removed from operable contact with said gas spring actuator and a lower position in operable contact with said gas spring actuator and means connected to said push rod for moving said push rod longitudinally of said guide tube bore between said upper and lower positions.

2. The bicycle seat mounting assembly of claim 1 wherein said means for supporting said bushing means comprises:

a horizontally disposed support head having one end adapted for clamping engagement with the bicycle frame vertical seat support member and another end adapted to contain said bushing means.

3. The bicycle seat mounting assembly of claim 2 wherein:

said bushing means support head one end includes a plug adapted for closely fitting into a top open end of the bicycle frame vertical seat support member for retention therein by a clamping band and a lowermost portion of said guide tube comprises a hood adapted to engagingly fit around said upper portion of said gas spring.

4. The bicycle seat mounting assembly of claim 1 additionally including an annular bushing affixed within said hollow receiver and within which said gas spring is slidably contained for axial movement with said gas spring piston rod lower end affixed to said receiver.

5. The bicycle seat mounting assembly of claim 1 wherein:

said guide tube is an elongated cylinder of which a portion has a non-circular perimeter and said bushing means contains said guide tube non-circular perimeter portion within bearing means for facilitating axial sliding but non-rotational movement of said guide tube within said bushing means.

6. The bicycle seat mounting assembly of claim 5 wherein:

said bushing means includes a pair of roller means each mounted for rotation on shaft supporting means on opposite sides of said guide tube contained therebetween with a face of each said roller means in rolling contact with each opposite side surface of said guide tube, said guide tube having opposite side surfaces of a different perimeteral configuration and each said roller means face has a contour complementary to that of said guide tube surface with which each said roller means face is in contact.

7. The bicycle seat mounting assembly of claim 6 wherein said shaft supporting means includes set screw adjusting means for adjusting the lateral position of at least one of said roller means shaft supporting means and supported roller means relative to said guide tube.

8. The bicycle seat mounting assembly of claim 6 wherein one said side surface of said guide tube contains a longitudinally extending concave groove and said roller means pair includes a ball having a contour conforming to said guide tube concave groove and a roller having a central concave contour conforming to the side surface of said guide tube opposite said guide tube one side surface containing said groove.

9. The bicycle seat mounting assembly of claim 8 wherein said shaft supporting means includes set screw adjusting means for adjusting the lateral position of at least one of said roller means shaft supporting means and supported roller means relative to said guide tube.

10. The bicycle seat mounting assembly of any one of claims 1–9 wherein said receiver includes a support extension protruding laterally outwardly and transversely of said receiver and said receiver attaching means includes:

clamping means adapted for adjustable placement circumferentially of and in clamping engagement with a lower portion of the bicycle frame vertical seat support member, said clamping means having a side mounted integral attaching segment adapted for engaging an outer portion of said receiver support extension and means interconnecting said clamping means attaching segment and said receiver support extension outer portion, whereby said receiver and bicycle frame vertical seal support member are rigidly interconnectable with their respective longitudinal axes arranged in parallel alignment.

11. The bicycle seat mounting assembly of claim 10 wherein:

said receiver support extension comprises a pair of spaced apart, vertically extending ears extending outwardly of said receiver, said clamping means is a split annular ring, said clamping means integral attaching segment comprises a hollow sleeve overlying one circumferential side and extending diametrically of said annular ring with said sleeve having ends adapted to fit between said receiver support extension ears and said interconnecting means comprises bolting means extending through said ears and said sleeve means.

12. A shock absorbing and adjustable height bicycle seat mounting assembly for installation onto a bicycle frame hollow vertical seat support member for supporting a bicycle seat thereon, said mounting assembly comprising:

a seat supporting guide tube movably supported within bushing means with said guide tube and said bushing means mutually configured for axial sliding but non-rotational movement of said guide tube within said bushing means, said guide tube containing a longitudinally extending internal bore and having a top end adapted for mounting a bicycle seat thereon, said bushing means being adapted for affixment to a top portion of the bicycle frame vertical seat support member with said supported guide tube vertically depending therefrom interiorly of the bicycle frame hollow vertical seat support member, a gas spring, having an actuator and a piston rod along which said gas spring is operable for length adjusting axial movement in length adjusting and length locking modes upon operation of said actuator, adapted to be contained within the interior of a lower portion of the bicycle frame vertical seat support member for sliding axial movement therewithin with a lower end of said gas spring piston rod affixed to the bicycle frame vertical support member lower portion and an upper portion of said gas spring engaging a lower end of said vertically depending guide tube, a push rod slidably contained within said guide tube bore for axial sliding movement therewithin between an upper position removed from operable contact with said gas spring actuator and a lower position in operable contact with said gas spring actuator and means connected to said push rod for moving said push rod longitudinally of said guide tube bore between said upper and lower positions.

13. The bicycle seat mounting assembly of claim 12 additionally including an annular bushing sized for retention within a lower portion of the bicycle frame vertical seat support member and within which said gas spring is contained for axial movement.

14. A shock absorbing and adjustable height bicycle seat mounting assembly for installation within a bicycle frame vertical seat support member having a hollow interior for supporting a bicycle seat thereon, said mounting assembly comprising:

a seat supporting guide tube movably supported within bushing means with said guide tube and said bushing means mutually configured for axial sliding but non-rotational movement of said guide tube within said bushing means, said guide tube containing a longitudinally extending internal bore and having a top end adapted for mounting a bicycle seat thereon, said bushing means being adapted for fixed containment within a top interior portion of the bicycle frame vertical seat support member with said guide tube contained in said bushing means vertically depending therefrom within the hollow interior of the bicycle frame vertical seat support member, a gas spring, having an actuator and a piston rod along which said gas spring is operable for length adjusting axial movement in length adjusting and length locking modes upon operation of said actuator, adapted to be contained within the interior of a lower portion of the bicycle frame vertical seat support member for sliding axial movement therewithin with a lower end of said gas spring piston rod affixed to the bicycle frame vertical support member lower portion and an upper portion of said gas spring engaging a lower end of said vertically depending guide tube, a push rod slidably contained within said guide tube bore for axial sliding movement therewithin between an upper position removed from operable contact with said gas spring actuator and a lower position in operable contact with said gas spring actuator and means connected to said push rod for moving said push rod longitudinally of said guide tube bore between said upper and lower positions.

15. The bicycle seat mounting assembly of claim 14 additionally including an annular bushing sized for retention within a lower portion of the bicycle frame vertical seat support member and within which said gas spring is contained for sliding axial movement.

16. In a bicycle having a shock absorbing and adjustable height bicycle seat mounting assembly supported on a hollow vertical member of the bicycle frame wherein said mounting assembly comprises:

bushing means affixed to a top portion of said bicycle frame vertical member, a seat supporting cylindrical guide tube movably contained within said bushing means with said guide tube and said bushing means mutually configured for axial sliding but non-rotational movement of said guide tube within said bushing means and from which said guide tube vertically depends interiorly of said hollow bicycle frame vertical member, said guide tube containing a longitudinally extending internal bore, means for mounting a bicycle seat on a top end of said guide tube, a gas spring, having an actuator and a piston rod along which said gas spring is operable for length adjusting axial movement in length adjusting and length locking modes upon operation of said actuator, movably contained within a lower portion of said bicycle frame vertical member for sliding axial movement therewithin with a lower end of said gas spring piston rod affixed to said bicycle frame vertical member lower portion and an upper portion of said gas spring engaging a lower end of said vertically depending guide tube, a push rod slidably contained within said guide tube bore for axial sliding movement therewithin between an upper position removed from operable contact with said gas spring actuator and a lower position in operable contact with said gas spring actuator and means connected to said push rod actuatable by a bicycle rider for moving said push rod longitudinally of said guide tube bore between said upper and lower positions.

17. In the bicycle of claim 16 wherein said mounting assembly additionally includes an annular bushing affixed within said bicycle frame vertical member lower portion and within which said gas spring is contained for sliding axial movement with said gas spring piston rod lower end affixed to said bicycle frame vertical member lower portion.

18. In the bicycle of claim 17 wherein:

said guide tube is an elongated cylinder of which a portion has a non-circular perimeter and said bushing means contains said guide tube non-circular perimeter portion within bearing means for facilitating axial sliding but non-rotational movement of said guide tube within said bushing means.

19. In the bicycle of claim 16 wherein:

said guide tube is an elongated cylinder of which a portion has a non-circular perimeter and said bushing means contains said guide tube non-circular perimeter portion within bearing means for facilitating axial sliding but non-rotational movement of said guide tube within said bushing means.

* * * * *